Jan. 14, 1958 K. D. R. GIBBS 2,819,770
MEANS FOR SECURING A MOTOR VEHICLE AGAINST THEFT
Filed March 25, 1954 3 Sheets-Sheet 1
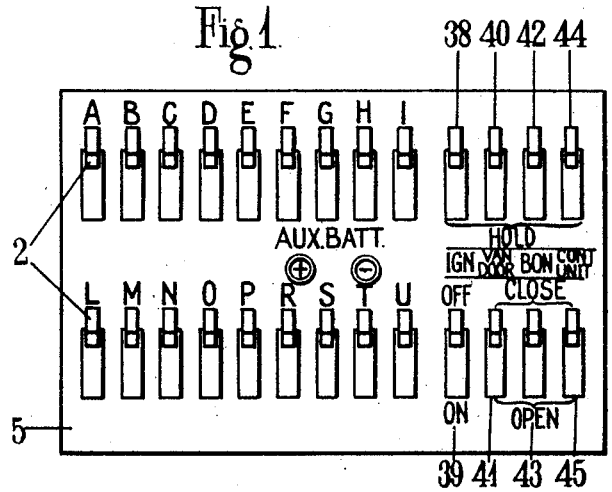
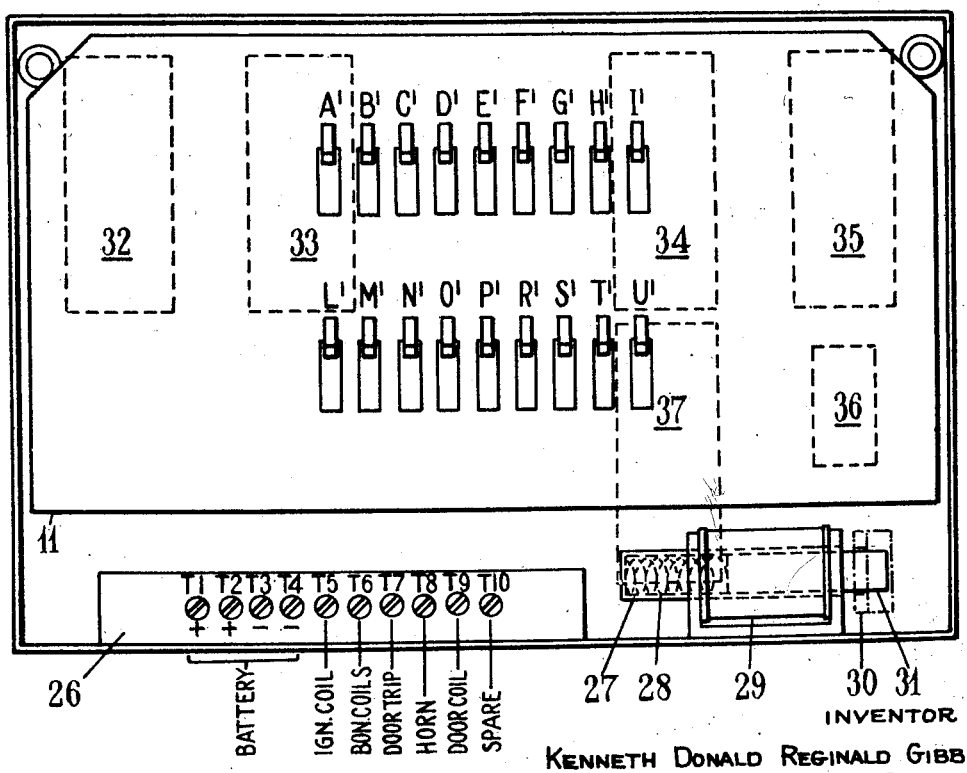
INVENTOR
KENNETH DONALD REGINALD GIBBS
BY Strauch, Nolan & Diggins
ATTORNEYS

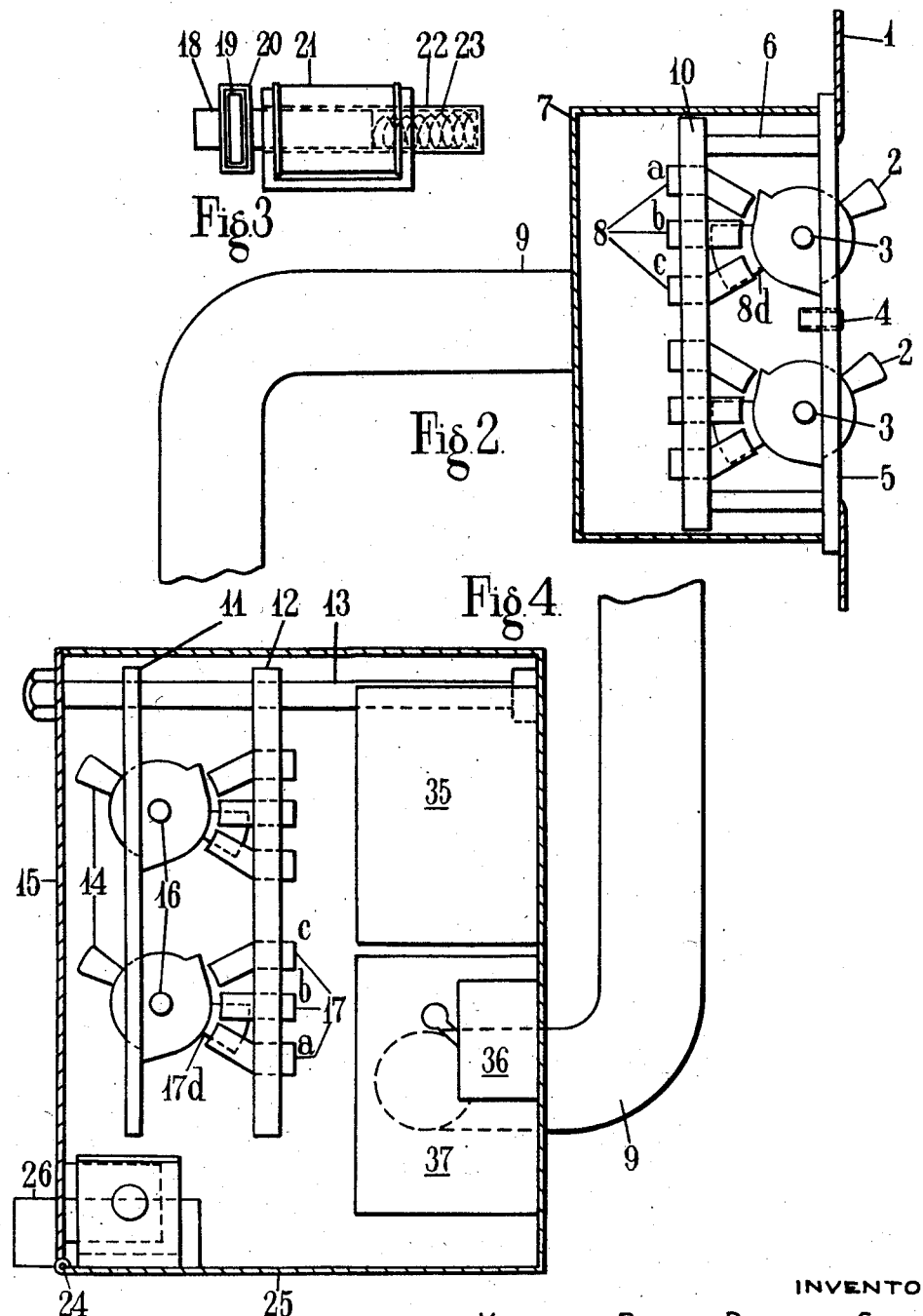

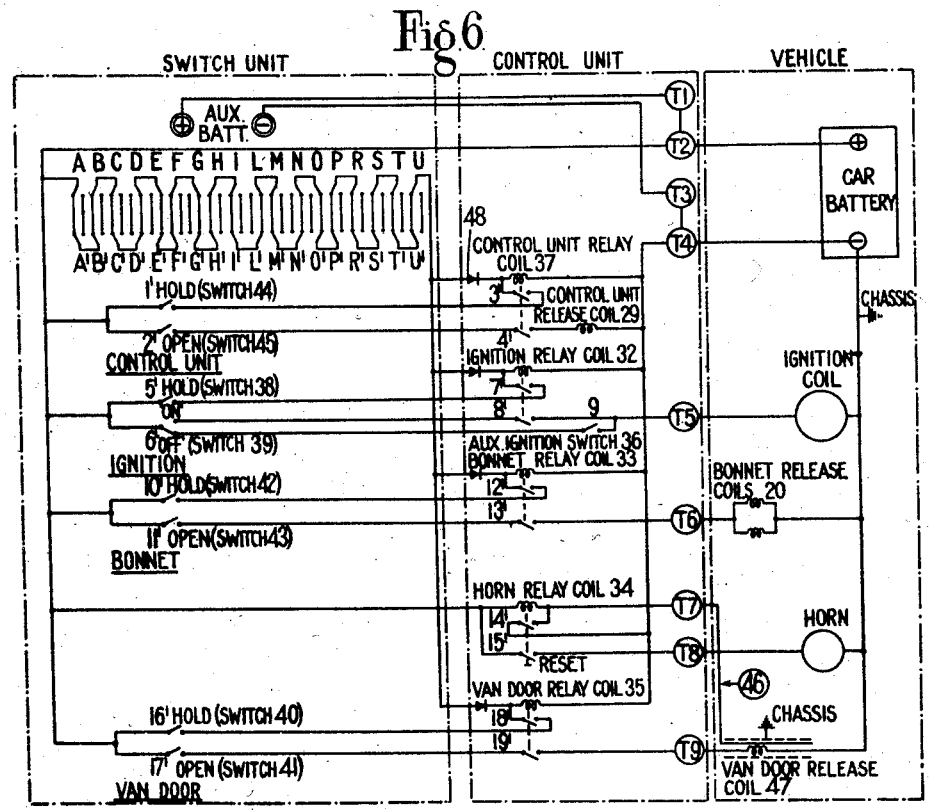

United States Patent Office 2,819,770
Patented Jan. 14, 1958

2,819,770

MEANS FOR SECURING A MOTOR VEHICLE AGAINST THEFT

Kenneth Donald Reginald Gibbs, Bristol, England, assignor to Britonic Products Limited, Bristol, England Application March 25, 1954, Serial No. 418,592

4 Claims. (Cl. 180—82)

This invention relates to improved means for securing a motor vehicle against theft by unauthorised persons, at the same time enabling authorised persons to effect the necessary controls readily and in a simple manner.

According to the present invention a number of change-over switches mounted on the dashboard of the vehicle, and indicated by the different letters of the alphabet or numerals, are selected to form predetermined "code words" or "code numbers" and by operating the switches corresponding to such code words or code numbers a desired number of operations are effected according to the selection of the switches, due to the electrical connections of the circuits controlled by the switches.

The general arrangement comprises a switch unit combined with a control unit by which the following operations are effected: (a) closure of the ignition coil circuit of the vehicle; (b) release of the van doors; (c) release of the bonnet-opening lever; and (d) release of the cover of the control unit.

By the arrangements according to the invention, a person in the driving seat, and not knowing the correct code words, will be unable to start the vehicle or open the bonnet or van doors. Even with the bonnet open, an unauthorised person will still be unable to remove the cover of the control unit if he does not know the code words. The code words may be changed as desired after opening the control unit cover.

One arrangement according to the present invention is illustrated, by way of example, in the accompanying diagrammatic drawings in which:

Figure 1 shows a front view of the switch panel;

Figure 2 shows the dashboard and switch unit;

Figure 3 shows the bonnet release coil;

Figure 4 is a transverse view of the control unit;

Figure 5 is a front view of the control unit with cover removed; and

Figure 6 is a wiring diagram.

Referring to Figure 1, the letters A, B . . . S, T, U, indicate the respective switches mounted at the back of the panel, and alongside are the switches 38, 39, 40, 41, 42, 43, 44 and 45 controlling the ignition circuit, van door, bonnet and control unit coils.

Figure 3 shows the bonnet release coil which is similar to that on the van door. 18 is a plunger actuated by coil 21 against a spring 23 in spring housing 22. 19 is the link in the normal bonnet release cable. 20 is a guide for link 19 or, in its absence, a bracket fixed to the bonnet to receive plunger 18.

Figure 6 shows how the various switches are interconnected with respect to the circuits to be controlled.

The component parts of the general arrangement are shown in Figures 2, 4 and 5, in which:

1 shows the face of the dashboard, and 5 is the switch panel. 2 is one of the moulded change-over switches, with shorting blade d of which there are twenty-sixe mounted on bearing pins 3. 4 are auxiliary battery contacts.

6 is a support for switch contact panel 10 in which are moulded switch contacts 8a, 8b and 8c. 7 is a cover for the switch unit.

9 is a flexible metallic hose containing the cables connecting the switch contacts 8a, 8b and 8c of the eighteen switches lettered "A, B . . . S, T, U" to associated contacts 17a, 17b and 17c of eighteen identical switches lettered "A', B' . . . S', T', U'" in control box 25. The hose 9 also carries the cables connecting the switch contacts 8a and 8b of the seven switches 38, 40, 41, 42, 43, 44 and 45, and the switch contacts 8a, 8b and 8c of switch 39, to their respective circuits in the control unit mounted beneath the bonnet of the vehicle (see Figure 6). 11 is a switch panel and 12 a switch contact panel in which are moulded switch contacts 17a, 17b and 17c. To fasten cover, plunger 31 is spring-loaded and slides into hole in plate 30 when coil 29 is de-energized. 14 is one of the moulded change-over switches, with shorting blade d, of which there are eighteen mounted on bearing pins 16. 26 is a terminal block, the terminals $T_1, T_2 \ldots T_9, T_{10}$ on which are connected to the car battery and the auxiliary battery ($T_1, T_2, T_3, T_4$), to the ignition coil ($T_5$), to the bonnet coil ($T_6$), to the door trip ($T_7$), to the horn ($T_8$) and the door coil ($T_9$) (see also Figure 6). $T_{10}$ is a spare. 31 is a plunger actuated by a coil 29 against a spring 28 in spring housing 27. 30 is a plate fixed to cover 15 and secured by the plunger 31.

32, 33, 34, 35 and 37 are relay coils for "ignition," "bonnet," "horn," "van door" and "control unit" circuits respectively. 36 is an auxiliary ignition switch.

In Figure 6, 46 is a trip wire. 48 is a rectifier in the circuits of the coils 32, 33, 35 and 37, to prevent "feedback" to these coils when any one of them is energised in a normal manner.

Assuming that as regards the above four operations the code word for controlling all circuits is "GOLDEN," the operations are as follows:

(a) Referring to the control of the ignition circuit, the switches corresponding to "GOLDEN" are moved into the "down" position, with the result that the ignition relay coil 32 is energised and the contacts 7' and 8' are closed. By moving the ignition switch 38 into the "down" position, i. e. "hold" (contact 5' closed), the ignition relay coil 32 is kept energised. In order to cancel the code word, the switches corresponding to "GOLDEN" are returned to the "up" position. When the ignition switch 39 is in the "down" position, i. e. "on" (contact 6' closed), the car ignition coil is energised. When the ignition switch 39 is in the "up" position i. e. "off" the car ignition coil is de-energised. When the ignition switch 38 is in the "up" position (Figure 1), the ignition relay coil is de-energised and all control switches are back to normal.

By closing the auxiliary ignition switch 36 (contact 9' closed) and using ignition switch 39 in a manner reverse to normal (i. e. "off"), any person may energise the car ignition coil from within the vehicle.

(b) Referring to the control connected with the opening and closing of the van door the operations are as follows:

The switches "GOLDEN" are in the "down" position, with the result that the van door relay coil 35 is energised and the contacts 18' and 19' are closed. By moving the van door switch 40 into the "down" position i. e. "hold" (contact 16' closed), the van door relay coil 35 is kept energised. In order to cancel the code word, the switches corresponding to "GOLDEN" are returned to the "up" position. When the van door switch 41 is in the "down" position, i. e. "open" (contact 17' closed), the van door release coil 47 is energised, thus enabling the van door to be opened. When the van door switch 41 is in the "up" position, i. e. "close"

the van door release coil is de-energised. When the van door switch 40 is in the "up" position, the van door relay coil is de-energised and all control switches are back to normal.

(c) Referring to the control connected with the opening and closing of the bonnet the operations are as follows:

The switches "GOLDEN" are in the "down" position, with the result that the bonnet relay coil 33 is energised and the contacts 12' and 13' are closed. By moving the bonnet switch 42 into the "down" position i. e. "hold" (contact 10' closed), the bonnet relay coil 33 is kept energised. In order to cancel the code word, the switches corresponding to "GOLDEN" are returned to the "up" position. When the bonnet switch 43 is in the "down" position, i. e. "open" (contact 11' closed), the bonnet release coil is energised and the bonnet can now be opened, but, if provided on the vehicle, it will also be necessary to pull the bonnet-opening lever. When the bonnet switch 43 is in the "up" position i. e. "close," the bonnet release coil is de-energised and the bonnet is secured if (also bonnet-opening lever) in place. When the bonnet switch 42 is in the "up" position, the bonnet relay coil is de-energised and all control switches are back to normal.

(d) Referring to the control connected with the opening and closing of the control unit the operations are as follows:

The switches "GOLDEN" are in the "down" position, with the result that the control unit relay coil 37 is energised and the contacts 3' and 4' closed. By moving the control unit switch 44 into the "down" position i. e. "hold" (contact 1' closed), the control unit relay coil 37 is kept energised. In order to cancel the code word, the switches corresponding to "GOLDEN" are returned to the "up" position. When the control unit switch 45 is in the "down" position, i. e. "open" (contact 2' closed), the control unit release coil is energised, thus enabling the cover 15 to be opened. When the control unit switch 45 is in the "up" position, i. e. "close," the control unit release coil is de-energised. When the control unit switch 44 is in the "up" position, the control unit relay coil is de-energised and all control switches are back to normal.

(e) Referring to the horn relay coil (34) circuit, the relay is energised if the trip wire 46, which is run in the same flexible metallic hose as are the two wires connected to the van door release coil 47, is connected to "earth." This would occur if an attempt were made to cut through the normally "earthed" metallic hose containing the three wires, whereupon contact 14' would close to keep energised the horn relay coil, and contact 15' would also close to operate the horn. A "reset" within the control unit is provided to disconnect the supply to the horn.

In the above example, the word "GOLDEN" has been chosen for controlling all circuits and all that is required is to place in the "down" position the letters G' O' L' D' E' N' in the control box 25. There is no limit to the number of letters in the "code word." Referring to Figure 6, it will be seen that a wrongly operated switch in the switch unit, Figure 2, will open the circuit.

Instead of the code word "GOLDEN," a code number may be used, in which case the switches would be indicated by numerals.

I claim:

1. Means for securing a motor vehicle having an electric ignition circuit against interference by unauthorised persons comprising in combination a relay for energising the ignition circuit, a switch unit comprising a plurality of individual selectively operable "code" switches indicated by code symbols, at least one additional switch for controlling the closure of the ignition circuit and a control unit comprising a corresponding number of "code" switches indicated by the same code symbols and having electrical connections with the said "code" switches of the switch unit, the circuit connections being such that with appropriate individual switches in the control unit set according to the setting of said switches with corresponding code symbols in the switch unit and also the ignition switch being closed, the ignition relay is energised and the ignition circuit is closed.

2. Means for securing a motor vehicle having an electric ignition circuit against interference by unauthorised persons comprising in combination a coil in a door release circuit, a relay for energizing said coil, a switch unit comprising a plurality of individual selectively operable "code" switches indicated by code symbols, a switch for controlling the closure of the door circuit for releasing the door and a control unit comprising a corresponding number of "code" switches indicated by the same code symbols and having electrical connections with the said "code" switches of the switch unit, the circuit connections being such that with appropriate individual switches in the control unit set according to the "code" word or "code" numeral, upon switches with corresponding code symbols in the switch unit and also the door release switch being closed the door relay and door release coil are energised and the door is released.

3. Means for securing a motor vehicle against interference by unauthorised persons comprising in combination a relay for energising a coil in a bonnet release circuit, a switch unit comprising a plurality of individual selectively operable "code" switches indicated by different code symbols, at least one switch for controlling closure of the bonnet release circuit and a control unit comprising a corresponding number of "code" switches indicated by the same code symbols, and having electrical connections with the said "code" switches of the switch unit, the circuit connections being such that with appropriate individual switches in the control unit set according to the "code" word or "code" numeral, upon switches with corresponding code symbols in the switch unit and also the bonnet release switch being closed, the bonnet release relay is energized and the bonnet is released.

4. Means for securing a motor vehicle against interference by unauthorised persons comprising in combination a coil in a circuit controlling operation of a part of the vehicle, a relay for energizing said coil, a switch for closing said circuit, a switch unit comprising a plurality of "code" switches indicated by code symbols, a control unit comprising corresponding number of "code" switches indicated by the same code symbols and having electrical connections with the said "code" switches of the switch unit, a cover for the control unit, a further coil in a circuit controlling release of the cover of the control unit, a further relay for energizing said further coil and a control unit cover release switch, the circuit connections being such that with appropriate individual switches in the control unit set according to a desired code designation, when switches in the switch unit with code symbols corresponding to said code designation are set, closing of said vehicle part operation switch or said cover release switch results in release of its controlled component.

References Cited in the file of this patent

UNITED STATES PATENTS

| 1,594,288 | Wethling | July 27, 1926 |
| 1,905,965 | Leschke et al. | Apr. 25, 1933 |
| 2,299,646 | Muller | Oct. 20, 1942 |
| 2,385,285 | Kolias | Sept. 18, 1945 |
| 2,583,752 | Smith | Jan. 29, 1952 |